United States Patent [19]
Gilley

[11] Patent Number: 5,781,458
[45] Date of Patent: Jul. 14, 1998

[54] METHOD AND APPARATUS FOR GENERATING TRULY RANDOM NUMBERS

[75] Inventor: James E. Gilley, Lincoln, Nebr.

[73] Assignee: Transcrypt International, Inc., Lincoln, Nebr.

[21] Appl. No.: 811,425

[22] Filed: Mar. 5, 1997

[51] Int. Cl.$^6$ .................................................. G06F 1/02
[52] U.S. Cl. ........................... 364/717.06; 380/46
[58] Field of Search ................ 364/717.01, 717.02, 364/717.06; 380/46

[56] References Cited

U.S. PATENT DOCUMENTS

| | | |
|---|---|---|
| 4,355,366 | 10/1982 | Porter . |
| 4,395,703 | 7/1983 | Piosenka . |
| 4,513,386 | 4/1985 | Glazer ............................... 364/717.06 |
| 4,667,301 | 5/1987 | Chiy et al. ............................. 364/717 |
| 4,799,259 | 1/1989 | Ogrodski . |
| 4,810,975 | 3/1989 | Dias . |
| 4,853,884 | 8/1989 | Brown et al. . |
| 4,855,690 | 8/1989 | Dias . |
| 5,007,087 | 4/1991 | Bernstein et al. . |
| 5,199,073 | 3/1993 | Scott . |
| 5,297,207 | 3/1994 | Degele ............................... 364/717.06 |
| 5,483,598 | 1/1996 | Kaufman et al. . |
| 5,493,612 | 2/1996 | Klund et al. . |

FOREIGN PATENT DOCUMENTS 0 180 676   5/1986   European Pat. Off. .

OTHER PUBLICATIONS

"Pseudo–Random Bit Sequences and Noise Generation", The Art of Electronics, pp. 437–446, 1980. Cambridge University Press.

*Primary Examiner*—Tan V. Mai
*Attorney, Agent, or Firm*—Zarley, McKee, Thomte, Voorhees, & Sease

[57] ABSTRACT

A method and apparatus for generating truly random numbers which may be used in a cryptographic key generator is adapted to extract entropy from the output signal of an RC oscillating circuit comprised of a resistor, a capacitor, and two nand gates. The entropy data is extracted by comparing the period of a first cycle with the period of a second cycle where the first and second periods are separated by two cycles. If the compared periods are equal, the data is discarded. If the previous period is greater than the later period, a "1" is assigned to a shift register. Otherwise, a "Ø" is assigned to the shift register. In this way, a plurality of bits are assigned to the shift register. A routine is then called which processes the bit data to reduce any cycle to cycle data correlation.

29 Claims, 3 Drawing Sheets

METHOD AND APPARATUS FOR GENERATING TRULY RANDOM NUMBERS

BACKGROUND OF THE INVENTION

1. Field of the Invention

The present invention relates to creating random numbers. More particularly, though not exclusively, the present invention relates to an apparatus and method for creating truly random numbers for use in a cryptographic key generator.

2. Problems in the Art

In the field of cryptography, which is the art and science of keeping information secret and secure, it is well known that randomly chosen cryptographic keys are desirable and essential to the security of a cryptographic system. Typical prior art cryptographic systems generate pseudorandom numbers which satisfy certain statistical properties, but which are completely deterministic. Therefore, pseudorandom numbers are not desirable for cryptographic key generators, due to their deterministic nature which allows someone to predict what the pseudo-random number will be if they know the algorithm and its initial parameters. Truly random numbers may be obtained from random processes, for example, atmospheric noise, rolling of a fair die, etc. Truly random sequences of numbers have three important properties. First, truly random number sequences pass all the statistical tests of randomness. Second, truly random number sequences must be unpredictable so that there is no way of determining the sequence in advance, no matter how much is known about the random number generating algorithm third, truly random sequences of numbers are unreproducable, so that given the identical initial conditions, the generator will produce with a high degree of probability a different sequence of numbers every time it is used.

Typically, truly random numbers cannot be created, but must be extracted from some truly random physical process, such as noise. Uncertainty, which is inherent in truly random number sequences, is referred to as entropy. It is therefore desirable to extract entropy from some truly random physical process and use that entropy to generate truly random numbers.

It is also desirable to generate truly random numbers in a convenient and inexpensive fashion. This is difficult for a number of reasons. First, a source of entropy is required. Typical prior art systems use an LSI integrated circuit which uses onboard resistive-capacitive (RC) oscillators as a source of entropy. This type of device is constructed entirely with hardware and therefore consumes power, costs money, and occupies excessive space on a printed circuit board. Another problem with generating random numbers based on an RC oscillator is that a method is required to extract the entropy from the oscillator. In addition, a method is needed to process the raw data extracted from the oscillator.

Random numbers have been generated using RC oscillators or a number of years. There are numerous references which discuss using RC oscillators to obtain entropy, such as "An LSI Random Number Generator" in the *Journal of Advances in Cryptology: Proceedings of Crypto 84* published in 1985 by Springer-Verlag, by the authors R. C. Fairfield, R. L. Mortenson, and K. B. Coulthart, pages 203-230 which is herein incorporated by reference. Other publications relating to using oscillators as a source of entropy include the book *A Million Random Digits with 100,000 Normal Deviates*, published by the Free Press Publishers in 1955, and "Noise in Relaxation Oscillators" by Asad A. Abidi and Robert G. Meyer in the journal *IEEE Journal of Solid-State Circuits*, Vol. SC-18, #6, of December 1983, and published by IEEE Press which are also herein incorporated by reference. An additional publication relating to cryptography and random numbers is Applied Cryptography, Second Edition, by Bruce Schneier, published by John Wiley & Sons in 1996 which is herein incorporated by reference.

FEATURES OF THE INVENTION

A general feature of the present invention is the provision of a method and apparatus for generating truly random numbers which overcomes problems found in the prior art.

A further feature of the present invention is the provision of a method and apparatus for generating truly random numbers which extracts the entropy from the instability of an RC oscillator and processes data from the oscillator to generate truly random numbers.

A further feature of the present invention is the provision of a method and apparatus for generating truly random numbers using an RC oscillator comprised of two simple logic gates, a resistor, and a capacitor.

Further features, objects and advantages of the present invention include:

A method and apparatus of generating truly random numbers which uses an RC oscillator comprising a resistor, capacitor, and two logic gates which are part of a microprocessor.

A method and apparatus of generating truly random numbers which uses the variation in period of the output signal of an oscillating circuit as a source of entropy.

A method and apparatus for generating truly random numbers which compares measured periods from nonsuccessive cycles of the output signal of an oscillating circuit as a source of entropy.

An apparatus and method for generating truly random numbers which processes raw data to destroy correlation and distill entropy.

A method and apparatus for generating truly random numbers which combines bits from a shift register and a random number buffer to add additional entropy to the random numbers.

An apparatus and method for generating truly random numbers which uses a bit assignment technique to generate the random numbers.

An apparatus and method for generating truly random numbers which may be used as a cryptographic key generator which creates truly random keys for use in public or private key cryptographic algorithms.

An apparatus and method for generating truly random numbers which may be used with a simulation system where random numbers are used to exercise a process to make certain that a system functions properly under all conditions.

An apparatus and method for generating truly random numbers which can be implemented efficiently and inexpensively.

These as well as other objects, features, and advantages of the present invention will become apparent from the following specification and claims.

SUMMARY OF THE INVENTION

The apparatus and method of the present invention is used by systems requiring a source of random numbers to generate truly random numbers. The invention comprises an RC oscillating circuit to provide a source of entropy as well as a processor for extracting the entropy from the RC oscillating circuit. The invention also processes the extracted entropy data to reduce any cycle-to-cycle data correlation.

The RC oscillating circuit of the present invention may optionally be comprised of two oscillating logic gates used along with a resistor and a capacitor. One possible process for extracting entropy data from the oscillator signal is by comparing the periods of nonsuccessive cycles of the oscillator signal. The difference in the compared periods can be used to assign a bit to a memory location. The present invention may also process a plurality of such bits to reduce any correlation between successive bits as well as distill entropy from the data.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalencies which may be included within the spirit and scope of the invention.

The present invention is an apparatus and method for generating truly random numbers for use as systems such as a public or private cryptographic key generators. The invention consists of a hardware portion and a software portion. The hardware portion provides a source of entropy while the software portion provides a technique for extracting entropy from the source of entropy. The software also includes a method of processing the raw data from the source of entropy to destroy data correlation and distill entropy.

Figure 1:
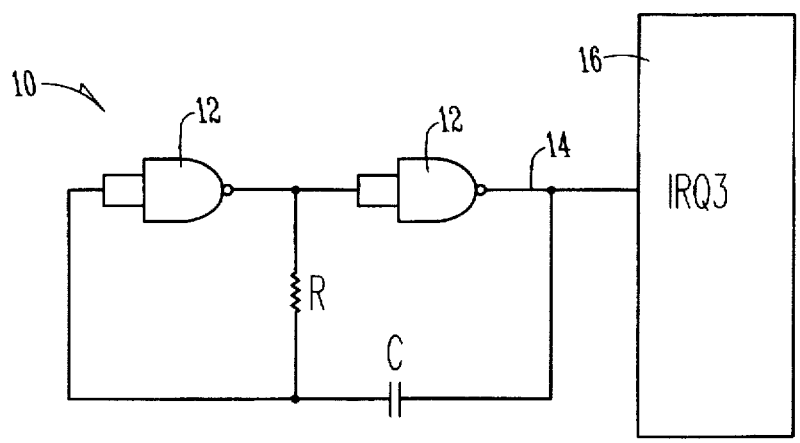
FIG. 1 shows an electrical schematic diagram of the oscillating circuit and processor of the present invention.

FIG. 1 shows the hardware portion of the present invention. The hardware portion includes an RC oscillating circuit 10 which consists of two digital logic gates such as the nand gates 12 shown in FIG. 1, a resistor R, and a capacitor C. The RC oscillating circuit 10 generates an interrupt which is used by software portion. The output 14 of the RC oscillating circuit 10 is connected to an interrupt input pin on a microprocessor 16. In the preferred embodiment, the logic gates 12 are made from a CMOS 74HC00 nand gate circuit, resistor R is a 1KΩ resistor, and capacitor C is a 0.33 µF capacitor, all powered from a 5 volt DC source (not shown). The RC oscillator circuit 10 can be formed from any gate capable of being configured as in inverter, and therefore, a large variety of gates can be used. In some products containing a microprocessor there are generally spare logic gates available which can be used as the logic gates 12. Note that since a switching device (such as gates 12) generally consumes power in proportion to the speed at which it is running, and since the RC oscillator circuit 10 is running at a low audio frequency, the present invention consumes essentially no power in comparison to prior art circuits. The preferred microprocessor 16 of the present invention is a Texas Instruments TMS320C53 digital signal processor (DSP) operating at a clock frequency of 28.322 MHz. The interrupt input pin of that particular DSP is IRQ3. Using a DSP as the microprocessor 16 is advantageous since most cryptographic devices utilize some form of processor to implement the cryptographic engine, or some other function such as the digitization of speech, etc. Therefore, the processor is generally already present. The present invention then uses the "spare" time of the processor, such as might exist when the device is not in use. During this time, the invention can be generating random numbers, so they will be ready when needed by the cryptographic function of the device. The RC oscillating circuit 10, with the values given above, has an approximate average oscillating frequency of 1200 Hz and a duty cycle of about 50% and about a 4 volt amplitude. The oscillating frequency will vary somewhat from cycle to cycle and the average frequency will also drift over longer periods of time.

Figure 2:
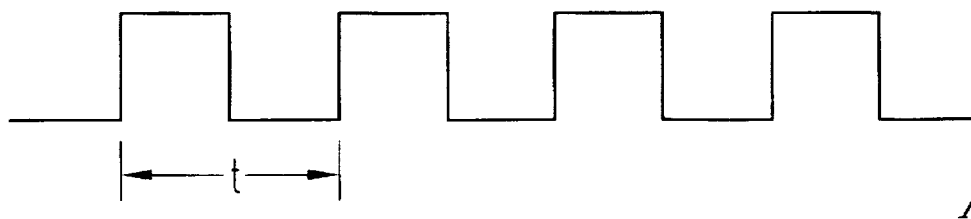
FIG. 2 shows the output signal from the oscillating circuit shown in FIG. 1.

The RC oscillating circuit 10 provides a physical source of entropy to the microprocessor 16. The microprocessor 16 must use some technique for extracting the entropy from the oscillator circuit 10. Since the oscillating circuit 10 is built from the logic gates 12, the output of the circuit 10 will be a digital signal having essentially two output voltage levels (FIG. 2). Twice during each cycle the oscillator will transition from one output voltage level to the other. Each cycle of the output signal will have a period t as shown in FIG. 2. The period t is related to the frequency of the oscillator 10 by the relationship t=1/f. Once every cycle (or about 1200 times per second in the preferred embodiment), the oscillator 10 will generate and interrupt on the DSP 16. The DSP 16 uses an interrupt service routine to make certain measurements on the oscillator 10 and to extract the entropy which is present due to fluctuations in the frequency of the oscillator.

Figure 3:
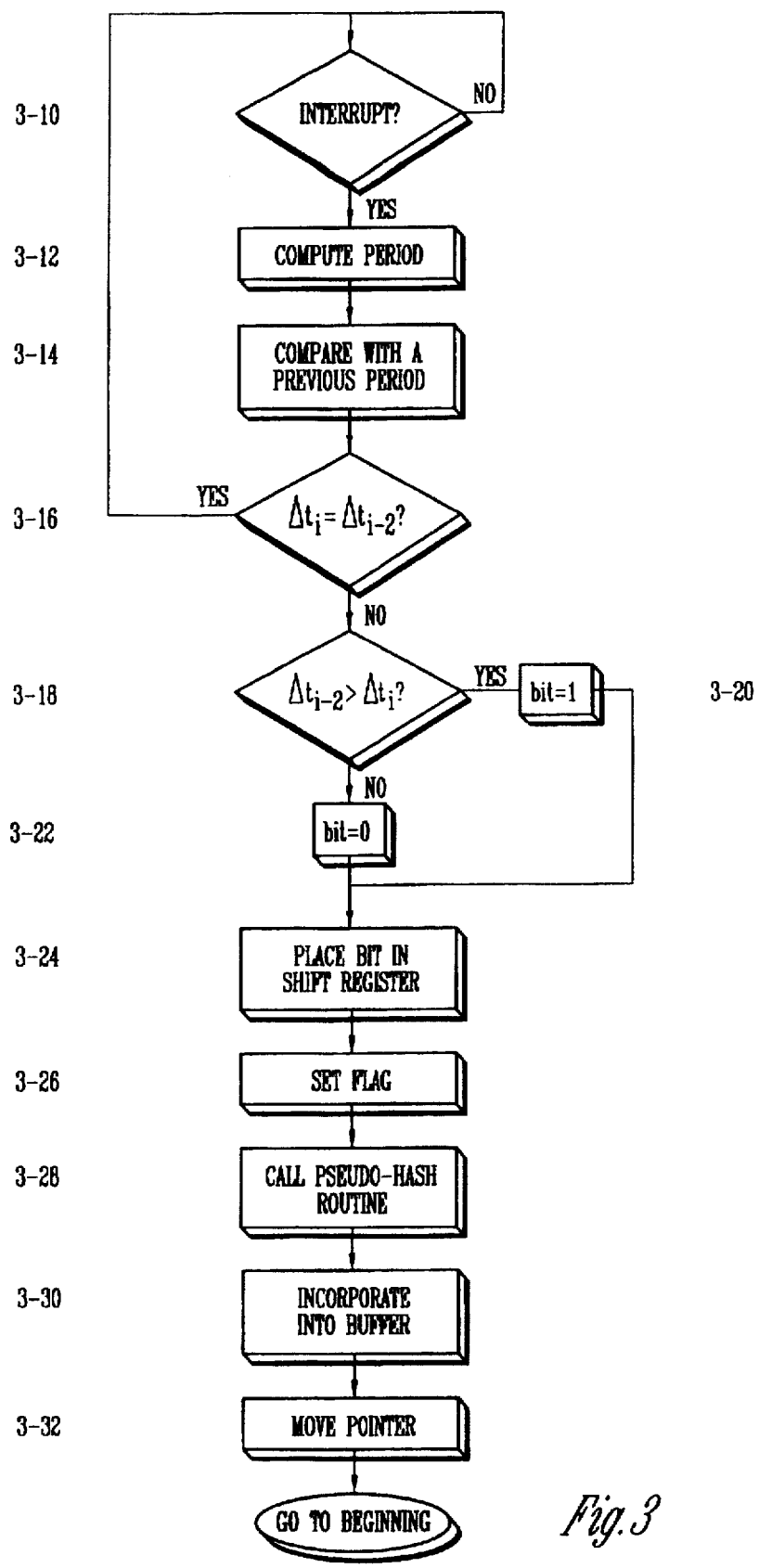
FIG. 3 is a flow chart illustrating the process of generating truly random numbers of the present invention.

FIG. 3 shows a flow chart of the interrupt service routine which runs every time the oscillating circuit 10 provides an interrupt to the DSP 16. As shown, steps 3-10 through 3-32 are performed as described below. Whenever an interrupt is generated (3-10), the DSP 16 stops any background processing and services the interrupt. In the interrupt service routine, the DSP 16 obtains the present time of a free running timer which is on board the DSP 16. The DSP 16 then computes the period of the output signal from the oscillator 10 by subtracting the time (from the free running timer) of the present interrupt from the time of the last interrupt (3-12). Note that the free running timer counts down rather than up. The resulting difference represents the instantaneous period t of the output signal of the oscillator 10 in terms of the DSP timer ticks, which, in this case, are about 35 nsec (1/28.322 MHz). As the frequency of the RC oscillator changes, so does its period since t=1/f.

From cycle to cycle of the output signal of the oscillating circuit 10, there is a high degree of correlation in the measured values of the periods t. Therefore, there is relatively little or no difference in the measured periods over a short interval of time. However, over longer intervals of several cycles, there is a considerable variation in oscillator periods t. Also note that the faster that the free running timer of the DSP 16 operates, the more accurately we may measure the period of the output signal of the RC oscillating circuit 10 and therefore can detect more subtle variations in the period of the output signal. From the standpoint of generating truly random numbers, this high cycle to cycle correlation of the output signal of the RC oscillating circuit 10 is undesirable since the difference in periods t from one cycle to the next will frequently be small, or even zero, depending on the accuracy of the measurements. Therefore, any entropy obtained from the cycle to cycle variations in the output signal of the RC oscillator 10 will not be truly random, but will instead display some degree of predictability. However, there is some entropy present in the cycle to cycle variation of the output signal of the oscillator 10 over a longer period of time.

The cycle to cycle correlation present in the oscillator makes it more difficult to extract entropy from the oscillator. In order to obtain truly random numbers from this source of entropy, this correlation must be destroyed. One method of reducing this correlation is to make period comparisons between two cycles which are not successive, but are instead separated by one or more cycles. There is a significant decrease in cycle sample correlation when the number of cycles between comparisons is increased from one to two cycles. Further increases in the number of cycles between comparisons result in a more gradual reduction in correlation. Since memory storage requirements increase as the number of cycles between comparisons increase, it is desirable to make the quantity of cycles between comparisons as small as possible. In the preferred embodiment of the present invention, the period of the present cycle ($\Delta t_i$) is compared with the period of two cycles ago ($\Delta t_{i-2}$). The result of this comparison represents the measured difference between the period of the present cycle with the period of two cycles ago (step 3-14). If these two periods are identical ($\Delta t_i = \Delta t_{i-2}$) within our ability to measure them, the result is discarded and the interrupt service routine exits with no additional action (3-16). If the two measured periods are different ($\Delta t_i \neq \Delta t_{i-2}$), the present invention will extract the entropy present in this variation by assigning a "random" bit. A value is based on whether the new period is less than or greater than the period two cycles ago. If the period of two cycles ago is greater than the period of the present cycle ($\Delta t_{i-2} > \Delta t_i$), a "1" is shifted into a 32-bit shift register (steps 3-28 and 3-20). If the measured period two cycles ago is less than the period of the present cycle ($\Delta t_{i-2} < \Delta t_i$), a "Ø" is shifted into the 32-bit shift register (3-22). Whenever a new bit is placed in the 32-bit shift register (3-24), a flag is set (3-26) to inform the background routine that a new bit has been placed in the shift register.

In the background, of the interrupt service routine, the DSP 16 may be performing other tasks, but the DSP 16 will look for the flag indicating that a new bit is present in the shift register. In addition to the shift register, a large buffer of random bits is maintained and is updated as new entropy is extracted from the oscillator circuit 10. In the preferred embodiment, this buffer is 512-bits long and is updated by 32 bits at a time.

Figure 4:
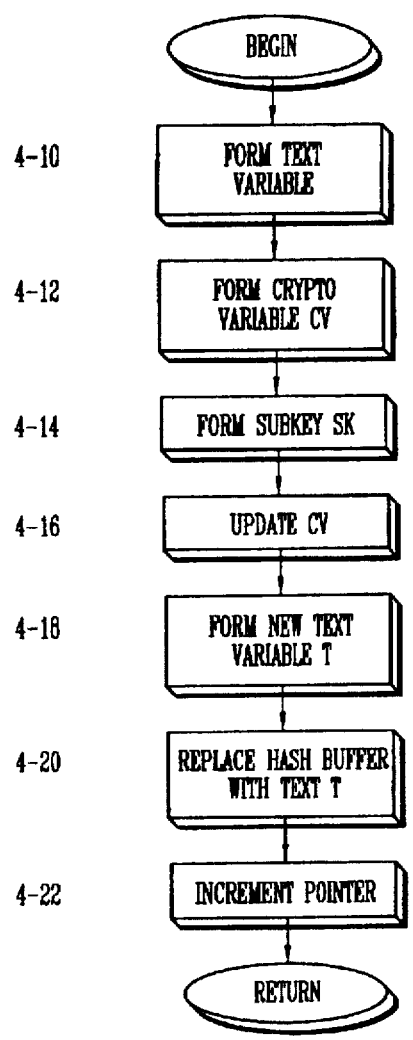
FIG. 4 is a flow chart illustrating the smash routine of the present invention.

The bits obtained by the process described do contain entropy, but they also possess some degree of bias, and hence can not be considered truly random. Therefore, the stream of bits obtained with this technique must be further processed before the results are usable as truly random numbers. The preferred embodiment of the present invention uses a pseudo-hash routine (step 3-28) in order to distill entropy from the data gathered from cycle to cycle variations in the output signal in the RC oscillator circuit 10. The pseudo-hash routine is described in detail below and is shown in the flowchart of FIG. 4. The pseudo-hash routine destroys the correlation between successive bits and essentially removes all predictability from the system resulting in a truly random sequence of bits. The interrupt service routine and the pseudo-hash routine are both simple and efficient and can be coded to require very few processor cycles, and require very little processor memory. After the pseudo-hash routine has finished, the bits are incorporated into the buffer (3-30) and the pointer is moved to the next block (3-32).

As described above, when the DSP 16 detects a new bit in the 32-bit shift register, it calls the pseudo-hash routine to process the new data and incorporate it into the 512-bit random number buffer. This is done sequentially so that as time progresses, each 32-bit block of the 512-bit random number buffer is acted upon many times. A pointer is used to indicate which 32-bit block of the 512-bit buffer is to be processed on each specific call to the pseudo-hash routine. After each call of the pseudo-hash routine, the pointer is updated to point to the next 32-bit block, wrapping around to the start of the buffer when it reaches the end.

The pseudo-hash routine is described in detail below. the routine has two inputs, a pointer to a 32-bit block within the 512-bit random number buffer, and the 32-bit shift register containing the most recent 32-bits extracted from the oscillating circuit 10. The pseudo-hash routine combines the 32-bits from the shift register and the 32-bits from the selected block of the random number buffer in a non-linear fashion, and replaces the 32-bit block of the random number buffer with the output of the pseudo-hash routine. The nonlinear mixing "stirs up" the bits in the random number buffer which adds new entropy to the bits. This process destroys all correlation in the raw data obtained from the oscillator circuit 10 and essentially distills entropy from this data. After multiple calls to the pseudo-hash function, the resulting random number buffer will be truly random. Since the pseudo-hash routine is called after every oscillator cycle (where the period of the present cycle ($\Delta t$) is different from the compared cycle ($\Delta t_{i-2}$)), the random number buffer becomes thoroughly random in a short amount of time.

Figure 6:
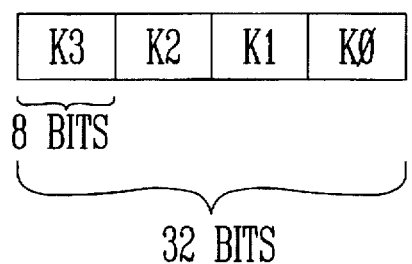
FIG. 6 is a diagram of the shift register used with the present invention.
Figure 5:
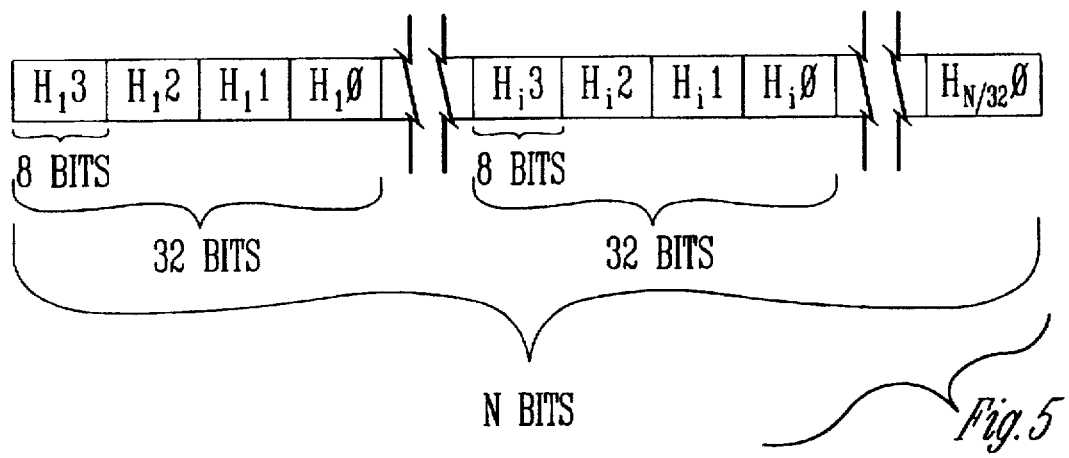
FIG. 5 is a diagram of the hash buffer used with the present invention.

FIG. 4 is a flow chart illustrating the operation of the pseudo-hash routine. The pseudo-hash routine starts with a hash buffer H, the size of which is selected so that it is equal to the number of random bits needed for the particular application. Preferably, the sized is always a multiple of 32-bits. FIG. 5 is a diagram of the hash buffer H with N bits and N/32 blocks. Each block contains 32 bits. Each block contains 4 bytes labeled $H_i3$, $H_i2$, $H_i1$, $H_i\emptyset$, etc. A diagram of a variable called the "key" is shown in FIG. 6. The variable is also 32 bits and contains 4 bytes labeled K3, K2, K1, and KØ. The variable serves as the shift register buffer K which stores the "random" bits from the interrupt service routine (step 3-24). Thus, at each interrupt, when ($\Delta t_i \neq \Delta t_{i-2}$), we shift this key register by 1 bit, destroying the oldest bit, and inserting the newest bit. Every time a new bit is placed in the shift register K, the pseudo-hash routine is executed (step 3-28). Prior to the pseudo-hash routine, a pointer is established which tells the routine which 32 bit block of the hash buffer H to operate on. Again, the pseudo-hash routine has two inputs, the contents of the shift register K, and the pointer to a 32-bit (2 words) block of the hash buffer H. The pseudo-hash routine will be described as operating on the block i which contains the 4 bytes labeled $H_i3$, $H_i2$, $H_i1$, and $H_i\emptyset$.

First, the pseudo-hash routine forms a temporary variable called Text T (step 4-10) and includes T3, T2, T1, and TØ, such that:

T3=$H_i3$,
T2=$H_i2$,
T1=$H_i1$, and
TØ=$H_i\emptyset$.

The pseudo-hash routine then forms a second temporary variable called the crypto variable CV (step 4-12) and includes CV3, CV2, CV1, and CVØ, such that:

CV3=H$_i$3⊕K3,
CV2=H$_i$2⊕K2,
CV1=H$_i$1⊕K1, and
CV∅=H$_i$∅⊕K∅, where "⊕" means exclusive-or (XOR), or Modulo 2 addition. The pseudo-hash routine then forms a subkey SK (step 4-14) by finding the XOR sum of all the Text T bytes:

SK=T3 ⊕T2⊕T1⊕T∅.

Next the crypto variable CV is updated (step 4-16) based on the subkey SK as follows:

CV3=S[CV3⊕SR], then SR=S[SK], then
CV2=S[CV2⊕SK], then SK=S[SK], then
CV1=S[CV1⊕SK], then SK=S[SK], then
CV∅=S[CV∅ ⊕ SK], where S[x] means use "x" as an index into a substitution table to obtain the entry there. Next, the new Text T is formed (step 4-18) from the old Text T and the updated crypto variable CV as follows:

TEMP=S[T3⊕K3⊕K2], then
T3=S[T2⊕K2⊕K1], then
T2=S[T1⊕K1⊕K∅], then
T1=S[T∅⊕K∅⊕K3], then
T∅=TEMP, where TEMP is a temporary variable used to hold a result which allows us to rotate the text bytes. Next, the hash buffer H$_i$ is replaced with the new Text T (step 4-20) as follows:

H$_i$3=T3,
H$_i$2 =T2,
H$_i$1=T1, and
H$_i$∅=T∅.

Next, the hash block pointer is incremented by 32 bits (step 4-22) so that the next call to the pseudo-hash routine will operate on the next hash buffer block. If the pointer goes beyond the end of the hash buffer (block H$_{N/32}$), the pointer is set back to the first block H$_1$.

As the oscillating circuit 10 runs, the present invention obtains "random" bits which are placed into the hash buffer H and are further stirred up the pseudo-hash routine. Over a period of time, the has buffer H is processed in such a manner that its contents are essentially truly random. The random bits are unreproducable and pass all statistical tests for randomness.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method of generating random numbers comprising the steps of:
   generating a signal from an RC oscillating circuit to provide a source of entropy;
   providing software which performs the processing steps of:
      extracting entropy data from the signal generated by the RC oscillating circuit, and
      processing the data to reduce any cycle-to-cycle data correlation.

2. The method of claim 1 wherein the RC oscillating circuit comprises two logic gates.

3. The method of claim 2 wherein the logic gates are nand gates.

4. The method of claim 2 wherein the logic gates are part of a processor.

5. The method of claim 1 wherein the step of extracting entropy data further comprises the steps of:
   determining the periods of a plurality of cycles of the signal;
   comparing at least two of the determined periods; and
   assigning a value to a memory location based on the comparison of the at least two of the determined periods.

6. The method of claim 5 wherein the value assigned to the memory location is determined by whether the more recent of the at least two of the determined periods is greater than or less than the compared period.

7. The method of claim 5 wherein the step of comparing at least two of the determined periods is accomplished by comparing the period of the most recent cycle of the oscillating signal with the period of a preceding non-successive cycle of the oscillating signal.

8. The method of claim 7 wherein the previous non-successive cycle is two cycles prior to the most recent cycle.

9. The method of claim 1 wherein the step of extracting entropy data further comprises the steps of:
   determining the frequencies of a plurality of cycles of the oscillating signal; and
   comparing at least two of the determined frequencies.

10. The method of claim 1 wherein the step of processing the data further comprises the steps of:
    placing the extracted entropy data into a first memory location;
    providing a second memory location; and
    processing the extracted entropy data and incorporating it into the second memory location.

11. The method of claim 10 wherein the processing is accomplished in a non-linear fashion.

12. The method of claim 10 wherein the processing of the extracted entropy data further comprises the steps of:
    combining the data in the first memory location and the data in a portion of the second memory location; and
    replacing the portion of memory in the second memory location with the combined data.

13. The method of claim 12 wherein the step of processing the data to reduce any cycle to cycle data correlation is performed once after substantially every oscillator cycle.

14. The method of claim 10 wherein the first memory location is comprised of a 32-bit shift register and the second memory location is comprised of a buffer having a plurality of 32-bits blocks.

15. A method of generating random numbers for use in a cryptographic key generator comprising the steps of:
    generating an oscillating signal from an RC oscillating circuit;
    determining the periods of a plurality of cycles of the oscillating signal;
    comparing at least two of the determined periods;
    assigning a bit value to a memory location based on the comparison of the at least two of the determined periods;
    repeating the steps of comparing and assigning in order to assign a plurality of bit values to the memory location; and
    processing the plurality of bit values to reduce any cycle-to-cycle data correlation to increase the randomness of the plurality of bits.

16. The method of claim 15 wherein the RC oscillating circuit comprises a resistor, a capacitor, and two digital gates.

17. The method of claim 16 wherein the two digital gates are inverting gates.

18. The method of claim 15 wherein the step of comparing at least two of the determined periods is performed without comparing periods of successive cycles.

19. The method of claim 18 wherein the compared periods are taken from cycles which are two cycles apart.

20. The method of claim 15 wherein the step of processing the plurality of bit values is accomplished using a hash routine.

21. The method of claim 15 further comprising the steps of:

providing a memory buffer;

combining the plurality of bit values in the memory location with data from a portion of the memory buffer; and replacing the data from the portion of the memory buffer with the combined data.

22. The method of claim 21 wherein the step of processing the plurality of bit values is performed after each time that a bit value is assigned to the memory location.

23. The method of claim 21 wherein the memory buffer is comprised of a buffer having a plurality of blocks of 32-bits each, and the memory location is comprised of a 32-bit shift register.

24. An apparatus for generating random numbers comprising:

an RC oscillating circuit comprising a resistor, a capacitor, and two logic gates for creating a digital signal having a period for each cycle of the digital signal;

a processor for performing the processing steps of:

(a) determining the period of a first cycle, (b) determining the period of a second cycle, (c) determining the difference between the determined periods of the first and second cycles, (d) assigning a bit to a memory location with the value of the bit being dependent on the determined difference, (e) repeating steps (a) through (d) for a plurality of cycles, to assign a plurality of bits to the memory location, and (f) processing the plurality of bits in the memory location to reduce and correlation between successive bits.

25. The apparatus of claim 24 wherein the two logic gates are comprised of nand gates.

26. The apparatus of claim 24 wherein the processor is a digital signal processor.

27. The apparatus of claim 24 further comprising a memory buffer containing data, wherein the step of processing the plurality of bits is accomplished by combining the assigned plurality of bits in the memory location with at least some of the data in the memory buffer and placing the combined data into the memory buffer.

28. The apparatus of claim 24 wherein the first and second cycles are non-successive cycles.

29. The method of claim 28 wherein the first cycle precedes the second cycle by two cycles.

* * * * *